United States Patent

Yahav et al.

[11] Patent Number: 6,091,905
[45] Date of Patent: Jul. 18, 2000

[54] TELECENTRIC 3D CAMERA AND METHOD

[75] Inventors: Giora Yahav; Gavriel Iddan, both of Haifa, Israel

[73] Assignee: 3DV Systems, Ltd, Yokneam Elit, Israel

[21] Appl. No.: 08/981,359

[22] PCT Filed: Jun. 20, 1996

[86] PCT No.: PCT/IL96/00021

§ 371 Date: Dec. 19, 1997

§ 102(e) Date: Dec. 19, 1997

[87] PCT Pub. No.: WO97/01112

PCT Pub. Date: Jan. 9, 1997

[30] Foreign Application Priority Data

Jun. 22, 1995 [IL] Israel .......................................... 114278
Dec. 1, 1995 [IL] Israel .......................................... 116223

[51] Int. Cl.[7] .................................................. G03B 17/24
[52] U.S. Cl. .......................................... 396/106; 356/4.07
[58] Field of Search .................................. 348/143–147; 356/1, 2, 4.07, 5–5.01, 141–141.2, 141.4, 141.5, 152–152.1; 396/106, 429

[56] References Cited

U.S. PATENT DOCUMENTS 3,571,493  3/1971  Baker et al. .
3,629,796  12/1971  Brownscombe et al. .

(List continued on next page.)

FOREIGN PATENT DOCUMENTS

0465806 A2  1/1992  European Pat. Off. .

OTHER PUBLICATIONS

W.J. Smith, Modern Optical Engineering, 2nd edition, p. 142.
Intensified Lens System; Commercial Publication by Imco Electro–optics Ltd. Essex, U.K.; (Jun. 1998).
Anthes et al; Non–scanned LADAR imaging and applications; SPIE vol. 1936, pp. 11–22, (1993).
Burns et al; Compact, 625–Channel Scannerless imaging Laser Radar Receiver; SPIE vol. 2748, pp. 39–46; (Jun. 1998).
Garcia et al; Characterization of a Scannerless LADAR System; SPIE vol. 1936, pp. 23–30; (1993).
Sackos et al; The emerging Versatility of Scannerless Range Imager; Spie vol. 2748; pp. 47–60; (Jun. 1998).
Hill et al; A Multi–Detecting Rangefinder Capable of Range Imaging; Applied Optics and Optoelectronics, University of York, Abstract Book, pp. 208–210;(Sep. 1994).
Anthes et al; Non–scanned LADAR imaging and applications; SPIE vol. 1936, pp. 11–22, (1993).
Muguira et al; Scannerless Range Imaging with a Square Wave; SPIE vol. 2472, pp. 106–113; Conference date Apr. 1995.
Burns et al; Compact, 625–Channel Scannerless imaging Laser Radar Receiver; SPIE vol. 2748, pp. 39–46; Conference date Apr. 10, 1996; Abstract in 1995.
Garcia et al; Characterization of a Scannerless LADAR System; SPIE vol. 1936, pp. 23–30; 1993.
Strand; Underwater Electro–optical System for Mine Identification; pp. 6–238 thru 6–247; Proceedings of the Autonomous Vehicles in Mine Countermeasures Symposium; Apr. 1995.

(List continued on next page.)

*Primary Examiner*—David M. Gray
*Attorney, Agent, or Firm*—Fenster & Company Patent Attorneys, Ltd.

[57] ABSTRACT

Apparatus for creating an image indicating distances to objects in a scene. The invention is comprised of a radiation source and modulator, telecentric optics for receiving and collimating the radiation reflected from the scene, a detector and a processor. The detector receives the collimated, reflected radiation and sends a signal to the processor. The processor forms an image having an intensity value distribution indicative of the distance of objects form the apparatus.

8 Claims, 3 Drawing Sheets

U.S. PATENT DOCUMENTS

| | | |
|---|---|---|
| 3,734,625 | 5/1973 | Aagard . |
| 4,143,263 | 3/1979 | Eichweber . |
| 4,408,263 | 10/1983 | Sternlicht . |
| 4,477,184 | 10/1984 | Endo . |
| 4,687,326 | 8/1987 | Corby, Jr. . |
| 4,734,733 | 3/1988 | Clapp et al. . |
| 4,734,735 | 3/1988 | Haneda . |
| 4,769,700 | 9/1988 | Pryor . |
| 4,780,732 | 10/1988 | Abramov . |
| 4,935,616 | 6/1990 | Scott . |
| 4,959,726 | 9/1990 | Miida et al. . |
| 4,971,413 | 11/1990 | Inoue . |
| 5,009,502 | 4/1991 | Shih et al. . |
| 5,056,914 | 10/1991 | Kollodge . |
| 5,081,530 | 1/1992 | Medina . |
| 5,090,803 | 2/1992 | Ames et al. . |
| 5,110,203 | 5/1992 | Maccabee . |
| 5,157,451 | 10/1992 | Taboada et al. . |
| 5,198,877 | 3/1993 | Schulz . |
| 5,200,793 | 4/1993 | Ulich et al. . |
| 5,200,931 | 4/1993 | Kosalos et al. . |
| 5,216,259 | 6/1993 | Stern et al. . |
| 5,220,164 | 6/1993 | Lieber et al. . |
| 5,225,882 | 7/1993 | Hosokawa et al. . |
| 5,243,553 | 9/1993 | Flockencier . |
| 5,253,033 | 10/1993 | Lipchak et al. . |
| 5,255,087 | 10/1993 | Nakamura et al. . |
| 5,265,327 | 11/1993 | Faris et al. . |
| 5,334,848 | 8/1994 | Grimm . |
| 5,343,391 | 8/1994 | Mushabac . |
| 5,351,677 | 10/1994 | Kami et al. . |
| 5,408,263 | 4/1995 | Kikuchi et al. . |
| 5,434,612 | 7/1995 | Nettleton et al. . |

OTHER PUBLICATIONS

Swartz; Diver and ROV Deployable Laser Range Gate Underwater Imaging System; Underwater Intervention '93 Conference Proceedings, pp. 193–199; 1993.

Delong et al; Underwater Laser Imaging System; Proceedings of the Autonomous Vehicles in Mine Countermeasures Symposium, pp. 6–103 thru 6–111; Apr. 1995.

Christie et al; Design and Development of a Multi–detecting Two–Dimensional Ranging Sensor; Measurement Science & Technology vol. 6 No. 9, pp. 1301–1308; Sep. 1995.

TELECENTRIC 3D CAMERA AND METHOD

FIELD AND BACKGROUND OF THE INVENTION

The present invention relates to three-dimensional cameras and, more particularly, to systems for accurately determining the distance to various objects and portions of objects in the scene.

Various techniques are known for creating a three-dimensional image of a scene, i.e., a two-dimensional image which, in addition to indicating the lateral extent of objects in the scene, further indicates the relative or absolute distance of the objects, or portions thereof, from some reference point, such as the location of the camera.

At least three basic techniques are commonly used to create such images. In one technique, a laser or similar source of radiation is used to send a pulse to a particular point in the scene. The reflected pulse is detected and the time of flight of the pulse, divided by two, is used to estimate the distance of the point. To obtain the distance of various points in the scene, the source is made to scan the scene, sending a series of pulses to successive points of the scene.

In yet another technique, a phase shift, rather than time of flight, is measured and used to estimate distances. Here, too, the entire scene or relevant portions thereof must be scanned one point at a time.

In a third technique, which also involves scanning, at least a single radiation source and corresponding detector are used, with suitable optics which act on the light in a manner which depends on the distance to the object being examined, to determine the distance to a particular point in the scene using a triangulation technique.

The major disadvantage of all three of the above-described techniques is that each requires point by point or line by line scanning to determine the distance of the various objects in the scene. Such scanning significantly increases the frame time of the system, requires expensive scanning equipment and necessitates the use of fast and powerful computational means and complex programming.

There is thus a widely recognized need for, and it would be highly advantageous to have, a method and system for rapidly and easily determining the distance of various points in a scene without the need for scanning and complex computational capabilities.

SUMMARY OF THE INVENTION

According to the present invention there is provided a telecentric system for creating an image indicating distances to various objects in a scene, comprising: (a) a source of radiation for directing source radiation at the scene; (b) a detector for detecting the intensity of radiation reflected from the objects in the scene; (c) a source modulator for modulating the source of radiation; (d) means for collimating a portion of the radiation reflected from the objects in the scene; (e) a reflected radiation modulator for modulating the collimated radiation reflected from the objects in the scene, the reflected radiation modulator being selected from the group consisting of acousto-optical devices and electro-optical devices; (f) a source modulator control mechanism for controlling the source modulator; and (g) a reflected radiation modulator control mechanism for controlling the detector modulator.

According to a preferred embodiment of the present invention, the source modulator control mechanism and the detector modulator control mechanism operate to simultaneously control the source modulator and the detector modulator.

According to further features in preferred embodiments of the invention described below, the modulator of the source radiation and the modulator of the reflected radiation serve to alternately block and unblock or alternately activate and deactivate the source radiation and reflected radiation, respectively.

According to still further features in the described preferred embodiments the source of radiation is a source of visible light, such as a laser and the detector includes photographic film, or a video camera sensor, such as a Charge Coupled Device (CCD.)

According to yet further features, the method further includes processing the intensity of radiation reflected from the objects in the scene to determine distances of the objects and, in a most preferred embodiment, comparing the intensities detected during a relatively continuous irradiation and detector period with intensities detected during modulation of the source and the detector.

Also according to the present invention there is provided a method for creating an image indicating distances to various objects in a scene, comprising: (a) directing source radiation at the scene using a radiation source; (b) detecting intensity of radiation reflected from the objects in the scene; (c) modulating the radiation source using a radiation source modulator; (d) collimating a portion of the radiation reflected from the objects in the scene; (e) modulating the collimated radiation reflected from the objects in the scene, the modulating of the reflected radiation being effected by a modulating device selected from the group consisting of acousto-optical devices and electro-optical devices; (f) controlling the source modulator; and (g) controlling the detector modulator.

According to further features the method further includes processing the intensity of the radiation reflected from the objects in the scene to determine distances of the objects.

In a preferred embodiment, the processing includes comparison of intensities detected during a relatively continuous irradiation and detector period with intensities detected during modulation of the source and the detector.

The present invention successfully addresses the shortcomings of the presently known configurations by providing a system and method for quickly and readily determining distances to portions of a scene without the need for expensive and time consuming scanning of the scene.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method which can be used to determine the distance of various portions of a scene, especially a scene which is relatively near.

The principles and operation of a system and method according to the present invention may be better understood with reference to the drawings and the accompanying description.

Figure 1A:
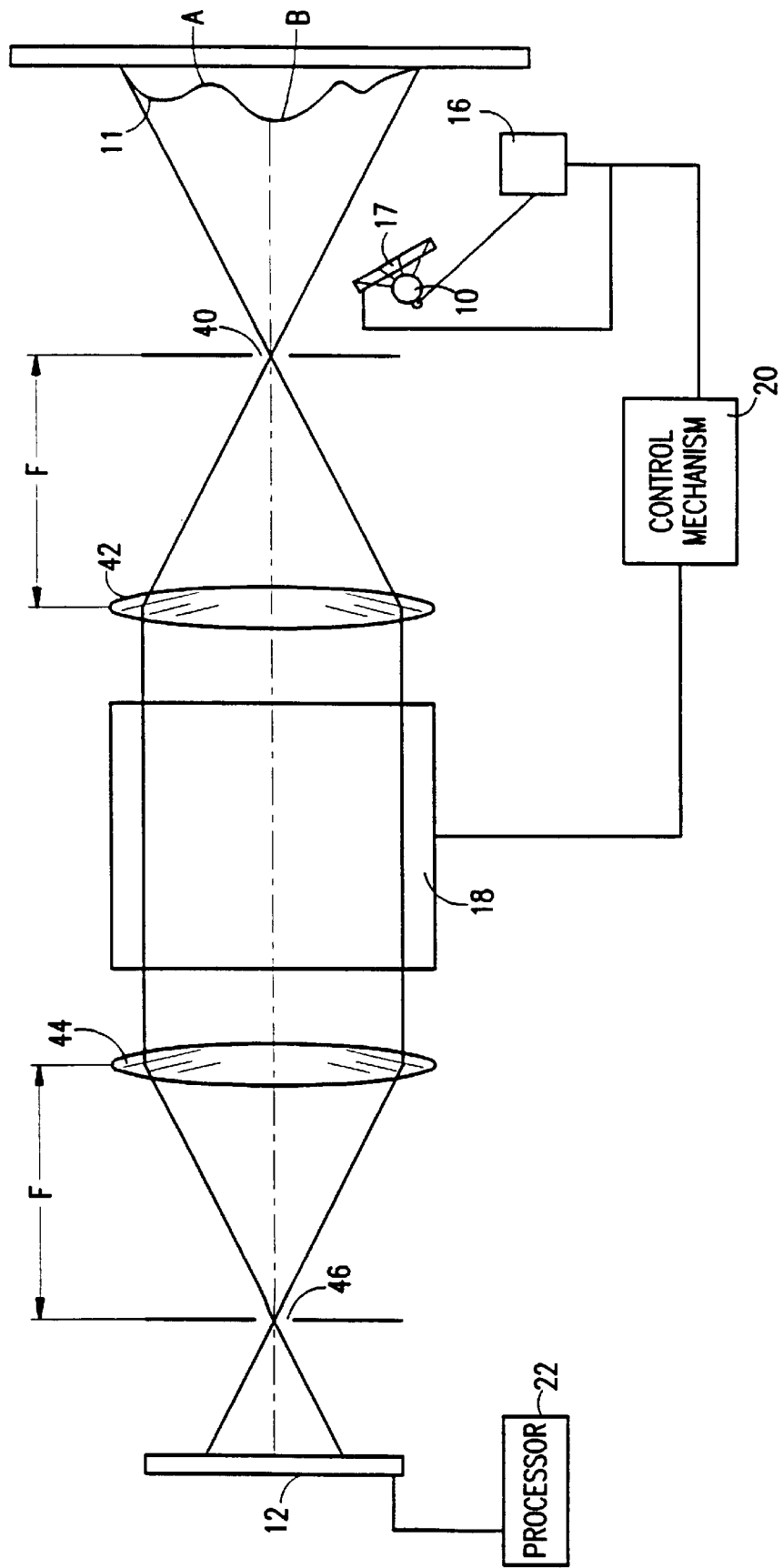
FIG. 1A shows one possible configuration of a system and method according to the present invention.
Figure 1B:
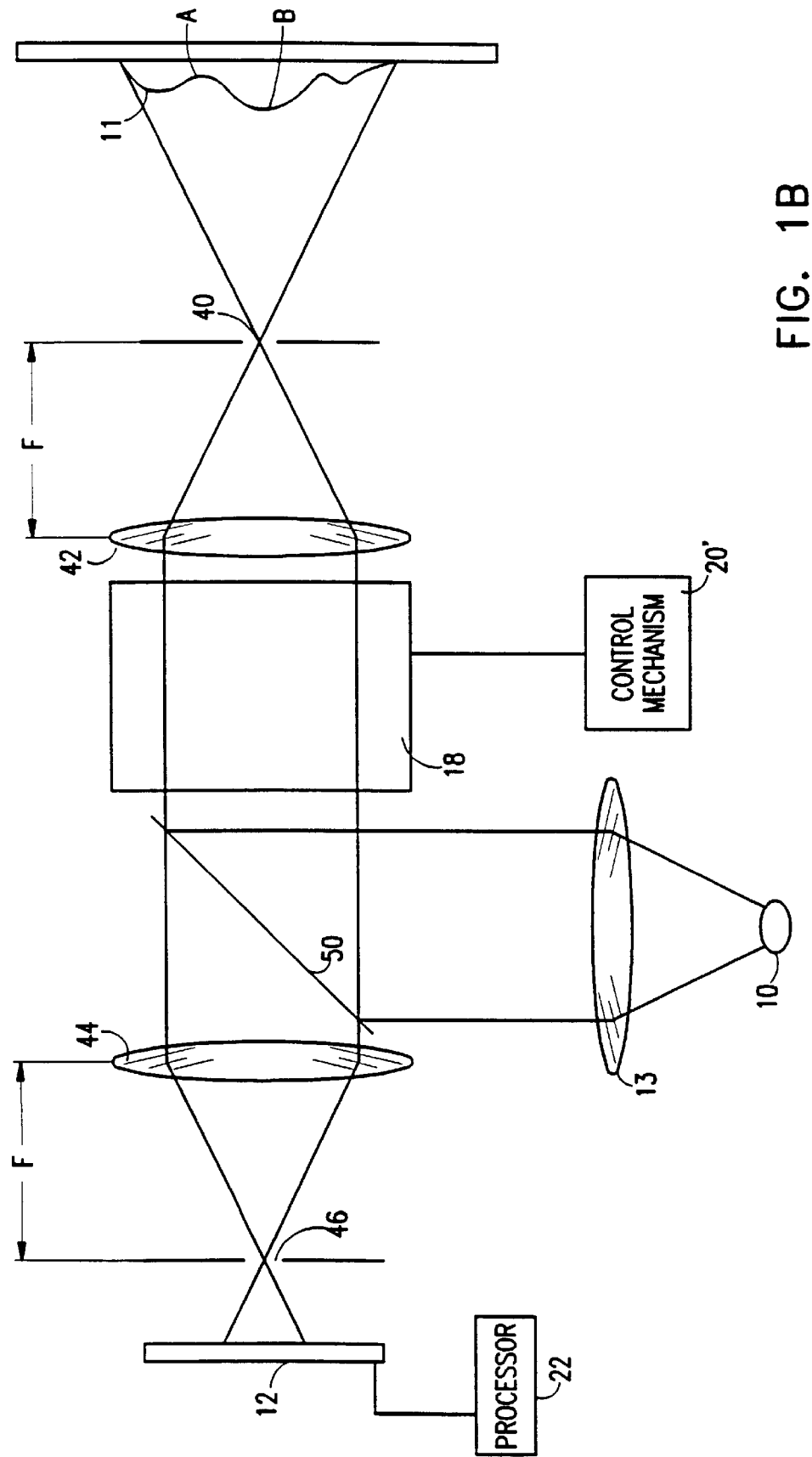
FIG. 1B depicts a second possible configuration of a system and method according to the present invention.

Referring now to the drawings, FIGS. 1A and 1B illustrates two illustrative configurations of systems according to the present invention.

With reference to the system of FIG. 1A, a source of radiation 10 directs radiation at the scene 11 being observed. For purposes of illustration, the scene depicted includes a three-dimensional object with reference being made herein to portions of the object which are relatively far and near, denoted 'A' and 'B', respectively. The radiation used may be any suitable radiation having a suitable wavelength for the distances examined and other suitable properties as will become more clear from the subsequent discussion. For most applications the radiation is visible or infrared radiation, such as laser radiation or stroboscopic light.

The system further includes a detector 12 for detecting the intensity of radiation reflected from the objects in the scene. The detected radiation is that portion of the source radiation which impinges upon the object or objects of the scene and which is reflected back toward detector 12. The detector used may be any suitable detector with a suitable resolution and suitable number of gray levels including, but not limited to, a photographic film camera, electronic camera and a video camera, such as a CCD camera.

The system includes a radiation source modulator, depicted schematically as item 16, for modulating radiation source 10 or the source radiation. The system further includes a detector modulator 18 for modulating the reflected radiation which is headed for detector 12.

The word 'modulate' as used herein is intended to include any varying of the level of operation or any operating parameters of radiation source 10 or of the source radiation itself and/or of the reflected radiation, as appropriate, including, but not limited to, the alternate blocking and unblocking and the alternate activating and deactivating of radiation source 10 or the source radiation and detector 12 or the reflected radiation.

Various mechanisms may be used to modulate radiation source 10 or the source radiation and the reflected radiation. For example, the source radiation may be physically blocked periodically using a suitable shutter 17 or similar element.

Other mechanisms which may be used to modulate radiation source 10 include various high frequency electronic modulation means for periodically deactivating radiation source 10/and or detector 12. Depicted in FIG. 1 is a source modulator 16 which is intended to convey the concept of electronically activating and deactivating radiation source 10.

Various means for modulating detector 12 may be envisioned, including those analogous to the means for modulating radiation source 10 described above. Preferably, the reflected radiation is modulated with the help of various electro-optical modulators, such as, for example, KDP (KH$_2$PO$_4$) or any other electro-optical crystal capable of modulating or switching light, lithium niobate and liquid crystals, having fast and accurate modulation capabilities or, preferably, gating, capabilities.

It is to be noted that whenever reference is made in the specification and claims to a radiation source modulator or to the modulation of the radiation source it is to be understood as involving the modulation of the radiation source itself and/or of the source radiation.

A system according to the present invention includes a miniature iris 40 through which some of the radiation reflected from object 11 can pass. Radiation passing through iris 40 is then collimated using at least one collimating object lens 42. Iris 40 is located substantially at the focal point of collimating object lens 42.

The collimated radiation then passes through a suitable acousto-optical device or an electro optical crystal, such as KDP 18 which serves as a modulation or gating device.

The modulated radiation exiting KDP 18 passes through at least one image lens 44 which sends the modulated radiation through an exit iris 46 placed substantially at the focal point of image lens 44. Radiation passing through exit iris 46 then impinges a suitable detector, such as a CCD sensor 12.

Finally, a system according to the present invention includes mechanisms for controlling source modulator 16 and detector modulator 18. Preferably, the mechanisms for controlling source modulator 16 and detector modulator 18 operate together in a coordinated manner, or, most preferably, are the same mechanism 20, so as to simultaneously control source modulator 16 and detector modulator 18.

The simultaneous control may be synchronous so that the operation of both radiation source 10 and detector 12 is affected in the same way at the same time, i.e., synchronously. However, the simultaneous control is not limited to such synchronous control and a wide variety of other controls are possible. For example, and without in any way limiting the scope of the present invention, in the case of blocking and unblocking control, radiation source 10 and detector 12 may be open for different durations during each cycle and/or the unblocking of detector 12 may lag the unblocking of radiation source 10 during each cycle.

A system according to the present invention further includes a suitable processor 22 which analyzes the intensity of radiation detected by detector 12 and determines the distances to various objects and portions of objects in the scene being examined. The operation of processor 22 is explained in more detail below.

A variation of a system according to the present invention is depicted in FIG. 1B. The configuration of FIG. 1B differs from that of FIG. 1A in a number of respects, the principal of these being that in FIG. 1B the modulation of both the source and reflected radiation is effected by KDP 18. This feature of the configuration of FIG. 1B dictates a number of changes in the configuration of the system. Thus, radiation source 10 is now input from the side into KDP 18. A beam splitter 50 is used to deflect a significant portion of the source radiation toward objects 11 and makes it possible for reflected radiation coming from objects 11 to pass through KDP 18 on its way to CCD sensor 12. The mechanism 20' which controls the modulation of KDP 18, is modified in that only a single device needs to be modulated instead of the synchronous control of two separate devices as in the configuration of FIG. 1A.

In operation, a typical system according to the present invention, using a laser as the radiation source, a CCD sensor as the detector and modulating the source and detector by synchronous switching, would operate as follows. Radiation source (e.g., laser) 10 or the source radiation is modulated. KDP 18 modulates the reflected radiation passing through it in a manner which is synchronous with the modulation of the source radiation. In the configuration of FIG. 1B KDP 18 modulates both the source radiation and the reflected radiation.

Figure 2:
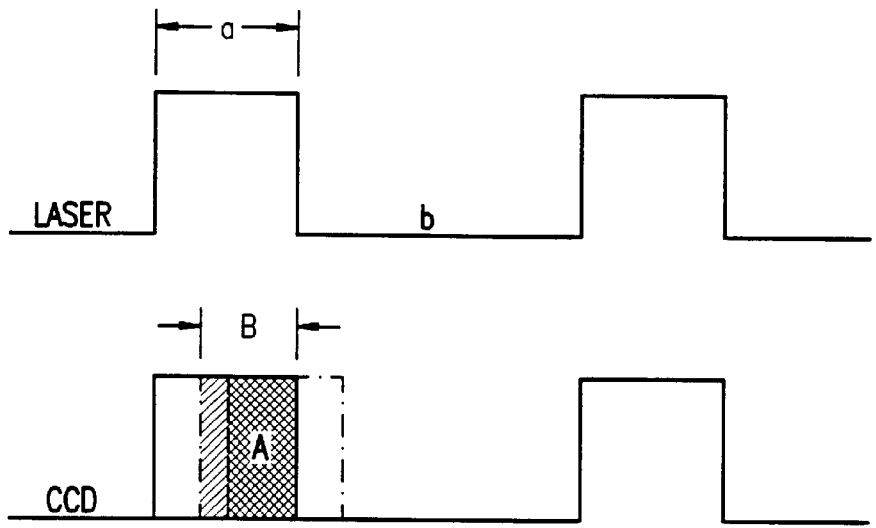
FIG. 2 shows a typical modulation scheme which might be employed in a system and method of the present invention.

This is schematically depicted in FIG. 2 which shows a type of square wave modulation, the legend 'CCD' intending to indicate the modulation of the reflected radiation as it goes through KDP 18. Thus during each cycle, both laser 10 and reflected radiation are active for a time 'a' and are inactive for a time 'b'. The times 'a' and 'b' may be the same or different. The wavelength of laser 10 and the time 'a' are selected so that light from laser 10 will be able to travel to the most distant objects of interest in the scene and be reflected back to CCD 12.

The selection of the time 'a' can be illustrated with a simple example. Let us assume that the scene to be examined is as in FIG. 1A and 1B with the maximum distance to be investigated being approximately 50 meters from the source or detector, i.e., both objects A and B are within about 50 meters from the detector and source. Light traveling from the source to the farthest object and back to the detector would take approximately 0.33 μsec to travel the 100 meters. Thus, the time duration 'a' should be approximately 0.33 μsec.

Systems and methods according to the present invention are based on the idea that a near object will reflect light to the detector for a longer period of time during each cycle than a far object. The difference in duration of the detected reflected light during each cycle will translate to a different intensity, or gray level, on the detector. Thus, for example, if we assume that a certain point on object B is a certain number of meters away from the source and/or detector while a certain point on object A is a greater distance away, then reflected light from the point on B will start arriving at the detector relatively early in the active portion of the detector cycle (see FIG. 2) and will continue to be received by the detector until the detector is deactivated at the end of the active portion of the detector cycle. The reflected light from the point on B will continue to proceed toward the detector for a period 'a' which corresponds to the period of irradiation (see the dot-dash-dot line in FIG. 2). However, the portion of this reflected radiation which falls beyond the deactivation or blocking of the detector will not be received by the detector and will not contribute toward the intensity sensed by the corresponding pixels of the detector.

By contrast, light reflected from the point on object A will start arriving at the detector later during the active portion of the detector cycle and will also continue to be received by the detector until the detector is deactivated.

The result is that reflected light from a point on object B will have been received for a longer period of time than reflected light from a point on object A (see the shaded areas in FIG. 2). The detector is such that the intensity of gray level of each pixel during each cycle is related to the amount of time in each cycle during which radiation was received by that pixel. Hence, the intensity, or gray level, can be translated to the distance, relative or absolute, of the point on the object.

Figure 3:
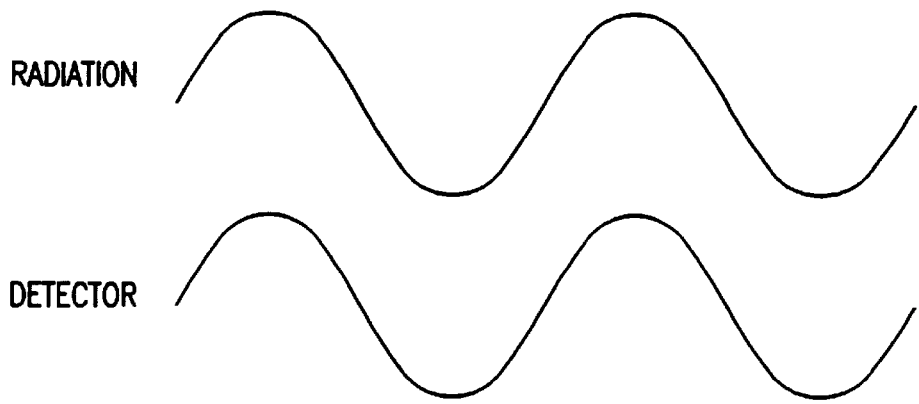
FIG. 3 shows another modulation scheme which might be employed.

As stated above, the synchronous on/off operation described in the example and depicted in FIG. 2, is not the only the only possible mode of operation. Other modulations may be used. For example, the radiation source and/or detector may be modulated harmonically as shown in FIG. 3.

To avoid obtaining false signals from distant objects which are beyond the region of interest, it may be desirable to increase the time duration 'b' during which the source/detector are inactive so that the bulk of the reflected radiation from faraway objects which are of no interest reaches the detector when the detector is deactivated and therefore do not contribute to the intensity detected by the corresponding pixel of the detector. A proper choice of the duration 'b' thus can be used to ensure that only reflected radiation from objects within the desired examination range are received during each specific cycle, thereby facilitating the interpretation of the intensity image.

As will readily be appreciated, in certain applications, different portions of the various objects in the scene may have different reflectivities. The different reflectivities result from different colors, textures, and angles of the various portions of the objects. Thus, two points which are the same distance from the source/detector will be detected as having different intensities which could lead to false distance readings which are based on intensities, as described above.

It is possible to readily compensate for differences in reflectivities of different objects or portions of objects being examined. As is well known, the intensity detected by a pixel of a detector receiving continuous radiation from a specific portion of a scene is directly proportional to the reflectivity of the portion of the scene being viewed and inversely proportional to the square of the distance between the portion of the scene being viewed and the detector.

It can readily be shown that when a pulsed radiation source, such as those described above, is used the intensity detected by a pixel of a detector receiving radiation from a specific portion of a scene is still directly proportional to the reflectivity of the portion of the scene being viewed but is inversely proportional to the distance between the portion of the scene being viewed and the detector raised to the third power.

Figure 4:
FIG. 4 illustrates yet another modulation scheme which can be used to enhance the accuracy of a system and method according to the present invention.

Thus, to compensate for the effects of different reflectivities, one can use both continuous radiation and pulsed radiation. An example of such a cycle is shown in FIG. 4. Here the radiation source and detector are active for a relatively long period of time to provide the continuous intensity of the objects in the scene. Periodically, the source and detector are deactivated and the source and detector are pulsed, in the same way as described above with reference to the basic embodiment, using one or more, preferably a train, of pulses.

The detection during the pulsing portion of the cycle is used as described above. However, in addition, the continuous detection during the long active period of the cycle is used to correct, or normalize, the distances and compensate for differences in reflectivities. The compensation can be accomplished by any convenient method, for example, by dividing the intensity of each pixel during the continuous period by the intensity of the same pixel during the pulsed period, with the quotient between the two being directly proportional to the distance of the region being viewed by the pixel.

While the invention has been described with respect to a limited number of embodiments, it will be appreciated that many variations, modifications and other applications of the invention may be made.

What is claimed is:

1. Apparatus for creating an image indicating distances to objects in a scene, comprising:

a modulated source of radiation, which directs radiation toward a scene, such that a portion of the radiation from the source is reflected from the scene and reaches the apparatus;

telecentric optics which receive and collimate radiation reflected from the scene;

a modulator which modulates the collimated radiation, such that a part of the portion of the radiation which reaches the apparatus is passed by the modulator, the part being dependent on the distance of respective portions of the scene from the apparatus;

a detector which detects an image formed from the modulated collimated radiation; and a processor which forms an image having an intensity value distribution indicative of the distance of objects from the apparatus, responsive to the intensity distribution of the detected image.

2. Apparatus according to claim 1 wherein the source and detector are boresighted.

3. Apparatus according to claim 2 wherein the source of radiation comprises a continuous source of radiation which is modulated by the same modulator as the detected radiation.

4. Apparatus for creating an image indicating distances to objects in a scene, comprising:

a modulated source of radiation, which directs radiation toward a scene along an axis, such that a portion of the radiation from the source is reflected from the scene and reaches the apparatus;

telecentric optics which receive radiation reflected from the scene and collimate it along said axis;

a modulator which modulates the collimated radiation such that a part of the portion of the radiation which reaches the apparatus is passed by the modulator, the part being dependent on the distance of respective portions of the scene from the apparatus;

a detector which detects an image formed by the modulated collimated radiation; and a processor which forms an image having an intensity value distribution indicative of the distance of objects from the apparatus, responsive to the intensity distribution of the detected image.

5. Apparatus according to any of the preceding claims and including a focusing lens which receives the modulated collimated radiation and focuses it onto the detector.

6. Apparatus according to any of claims 1–4 wherein the modulator is an electro-optical modulator.

7. Apparatus according to any of claims 1–4 wherein the modulator is a KDP modulator.

8. Apparatus according to any of claims 1–4 wherein the modulator is an acousto-optical device.

* * * * *